Patented Oct. 27, 1925.

1,558,707

UNITED STATES PATENT OFFICE.

STUART B. MOLONY, OF WELLESLEY HILLS, MASSACHUSETTS, ASSIGNOR, BY MESNE ASSIGNMENTS, TO R. T. VANDERBILT CO., INC., OF NEW YORK, N. Y., A CORPORATION OF NEW YORK.

RUBBER VULCANIZATION AND PRODUCT THEREOF.

No Drawing. Application filed December 20, 1919. Serial No. 346,307.

*To all whom it may concern:*

Be it known that I, STUART B. MOLONY, a citizen of the United States, and a resident of Wellesley Hills, in the county of Norfolk and State of Massachusetts, have made a new and useful Invention in Rubber Vulcanization and Products Thereof; of which the following is a specification.

The invention relates to the vulcanization of rubber or caoutchouc. It has for its principal objects; the provision of a process whereby the rapidity of vulcanization can be increased, whereby the time or temperature of vulcanization can be lessened, which can be practiced at a minimum of expense with a relatively small quantity of the accelerating agent, and the provision of a product which is of superior quality and durability.

In its broadest form the invention contemplates the use of the alkylated thiuramsulphides which are suitable for the purpose and more particularly tetramethyl thiuramsulphide. It has the following advantages over the amino-ammonium salt of dimethyl dithiocarbamic acid, which it has heretofore been proposed to use as an accelerator; it is a stable chemical compound, having a constant vulcanizing power as compared to the amino-ammonium salt, which is an unstable chemical compound, whose composition and vulcanizing power are constantly changing through a long period of time. It is much more convenient to handle, as it is odorless, dry and practically insoluble in water, while the amino-ammonium compound is offensive in odor, is of a pasty consistency instead of dry, and is soluble in water. It does not tend to give off gas during vulcanization, thereby making the rubber porous, as the amino-ammonium compound tends to do. It has greater vulcanizing activity than the amino-ammonium compound, and it does not have the basic reaction which makes the amino-ammonium compound act upon and tarnish the metals with which it comes in contact. It also appears to have no toxic effect upon animals, possibly because of its insoluble nature.

The tetramethyl thiuramsulphide having the properties described above, can be used satisfactorily in the vulcanization process according to the following formula as an example: 100 parts by weight of smoked ceylon, 30 parts by weight of zinc oxide, 5 parts by weight of sulphur, ⅕ part by weight of accelerating compound. At a temperature of 50 pounds steam pressure in a press a good cure will be obtained in about ten minutes. With the same compound at three pounds steam pressure a good cure will be obtained in a press in about 45 minutes.

The above compound may be made as follows:

Free dimethylamine is liberated in a gaseous form. On passing this gas into carbon bisulphide, amino-ammonium salt of dimethyl dithiocarbamic acid is formed with a reaction represented by the following equation:

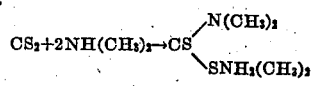

The group represented in the formula by $NH_2(CH_3)_2$ which is called amino-ammonium may be eliminated by oxidation or by other chemical means. The elimination by oxidation may be accomplished by a prolonged exposure of the amino-ammonium salt to air or ozone, or by treating it with a mild oxidizing agent, such as hydrogen peroxide, whereupon the amino-ammonium $NH_2(CH_3)_2$ is removed, and the remaining residue forms the anhydride of dithiocarbamic acid having the formula:

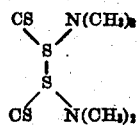

The anhydride may be termed tetramethyl thiocarbamyl disulfide or tetramethyl thiuramdisulphide. The essence of my invention resides in vulcanizing in the presence of the non-alkaline reaction-product formed by treating the amino-ammonium salt of dithiocarbamic acid, more particularly the alkylated compound, to remove the amino-ammonium radical. The removal of this radical is preferably accomplished by oxidation. The product formed may be termed an oxidation-product, but other equivalent chemical means as set forth may be employed. While I believe that such oxidation product is an anhydride of dithiocarbamic acid or a thiuramsulfide, I do not desire to be limited to any particular theory as to the composition of the reaction-product which is formed by the process set forth.

Other alkylated thiuramsulfides may also be employed as accelerators aside from the tetra-methyl thiuramsulfides, as for instance, the tetra-ethyl thiuramsulfide, which may be produced by a procedure paralleling that heretofore set forth with respect to the production of the tetramethyl thiuramsulfide.

The dithiocarbamic compounds set forth are non-alkaline in character and serve admirably as vulcanization accelerators affording decided advantages over basic or alkaline dithiocarbamic accelerators. As an example of the latter, the addition product formed by the addition of carbon disulfide to methylamin, may be mentioned. When the vulcanization is performed in the presence of the basic or alkaline accelerator, the alkaline radical continues to react with the sulfur after the vulcanization operation proper, is completed, thereby rendering the rubber harder than it should be. On the other hand, when a non-alkaline accelerator is employed, the action of the accelerator is practically complete as soon as the vulcanization proper ceases, affording a rubber that does not harden. This may be attributed to the fact that the alkaline dithiocarbamic accelerators are true catalysts, that is, remain in the compound in their original form and continue to react indefinitely, while the non-alkaline accelerators are not true catalysts, but substantially disappear from the vulcanized rubber practically as soon as the vulcanization ceases, resulting in a properly aged product.

The above mentioned compounds may be represented by the general formula.

$$\underset{X}{\overset{RCSM}{|}}$$

This is the general formula for the following substances:
1. Tetramethylthiuramdisulphide.
2. Tetraethyl thiuramsulphide.
3. Other thiuramsulphides which are the equivalents of Nos. 1, 2, and 3, the only difference being that other hydrocarbon radicals may be substituted for the methyl, and ethyl radicals.

The members of the group are used as accelerators in vulcanization preferably with substances containing combined zinc, for example, zinc oxide or with any other substances containing combined metal well known in the prior art. The combined metal may be represented by M' and its corresponding oxide will have the formula M'O. In the general formula, R may be nitrogen, M may be a salt forming group such as $$\underset{X}{\overset{SCR}{|}}$$

and X may be sulphur.

As indicated by the use of the accelerator set forth, the temperature of vulcanization may be lessened. It is an inherent property of these accelerators that they permit low temperature vulcanization.

What I claim is:

1. The process of accelerating the vulcanization of rubber comprising vulcanizing the same in the presence of a reaction-product of an amino-ammonium salt of dithiocarbamic acid from which the basic radical has been removed.

2. The process of accelerating the vulcanization of rubber comprising vulcanizing the same in the presence of a reaction-product of an amino-ammonium salt of alkylated dithiocarbamic acid from which the amino-ammonium radical has been removed.

3. The process of accelerating the vulcanization of rubber comprising vulcanizing the same in the presence of a non-alkaline dithiocarbamic compound.

4. The process of vulcanizing rubber comprising vulcanizing the same in the presence of a non-alkaline alkylated dithiocarbamic compound.

5. The process of accelerating the vulcanization of rubber comprising vulcanizing in presence of the non-alkaline reaction-product formed by oxidizing an amino-ammonium salt of dithiocarbamic acid to remove the basic amino-ammonium radical.

6. The process of accelerating the vulcanization of rubber comprising vulcanizing in the presence of the non-alkaline reaction-product formed by treating an amino-ammonium salt of dithiocarbamic acid to remove the basic amino-ammonium radical.

7. The process of accelerating the vulcanization of rubber comprising vulcanizing in the presence of the non-alkaline reaction-product formed by treating an amino-ammonium salt of dithiocarbamic acid to remove the basic radical.

8. The process of vulcanizing rubber comprising combining therewith a vulcanizing agent and an alkylated thiuramdisulphide, and vulcanizing the rubber.

9. A vulcanized rubber derived from rubber combined with a vulcanizing agent and an alkylated thiuramdisulphide.

10. The process of accelerating the vulcanization of rubber comprising vulcanizing the same in the presence of thiuramdisulphide.

11. The process of accelerating the vulcanization of rubber comprising vulcanizing the same in the presence of tetramethylthiuramdisulphide.

12. The process of accelerating the vulcanization of rubber comprising vulcanizing the same in the presence of tetrasubstituted thiuramdisulphide.

13. A vulcanized rubber compound containing before vulcanization a vulcanizing agent and a tetra-alkylated thiuramdisulphide, in which the substituting groups are hydrocarbon radicals.

14. A vulcanized rubber compound containing before vulcanization a vulcanizing agent and tetra-alkylated thiuramdisulphide.

15. A vulcanized rubber compound containing before vulcanization a vulcanizing agent and tetramethyl thiuramdisulphide.

16. An accelerator as an ingredient in the process of vulcanizing comprising a tetra-alkylated thiuramdisulphide in which the substituting groups are hydrocarbon radicals.

17. An accelerator as an ingredient in the process of vulcanizing comprising a tetra-alkylated thiuramdisulphide.

18. An accelerator as an ingredient in the process of vulcanizing comprising tetramethyl thiuramdisulphide.

19. The process of making rubber articles which comprises mixing with raw or crude rubber, a vulcanizing agent and an accelerator comprising a tetra-alkylated thiuramdisulphide, in which the substituting groups are hydrocarbon radicals, and heating the resulting compound to vulcanize the same.

20. The process of making rubber articles which comprises mixing with raw or crude rubber, a vulcanizing agent and an accelerator comprising a tetra-alkylated thiuramdisulphide, and heating the resulting compound to vulcanize the same.

21. The process of making rubber articles which comprises mixing with raw or crude rubber, a vulcanizing agent and an accelerator consisting of tetramethyl thiuramdisulphide, and heating the resulting compound to vulcanize the same.

22. The process of treating rubber or similar materials comprising combining it with a vulcanizing agent and a thiuramsulphide, and vulcanizing the rubber.

23. A vulcanized rubber derived from rubber, or similar material, combined with a vulcanizing agent and a thiuramsulphide.

24. An ingredient in the process of vulcanizing comprising a tetra-alkylated thiuramdisulphide.

25. An ingredient in the process of vulcanizing comprising tetramethyl thiuramdisulphide.

26. The process of making rubber articles which comprises mixing with raw or crude rubber a tetra-alkylated thiuramdisulphide, in which the substituting groups are hydrocarbon radicals, and heating the resulting compound to vulcanize the same.

27. The process of making rubber articles which comprises mixing with raw or crude rubber tetramethyl thiuramdisulphide, and heating the resulting compound to vulcanize the same.

In testimony whereof, I have hereunto subscribed my name this 19th day of December, 1919.

STUART B. MOLONY.